Jan. 7, 1958    R. F. DODD    2,819,459
OPEN-FACE NON-GLARE TYPE VIEWING HOOD
Filed May 6, 1954
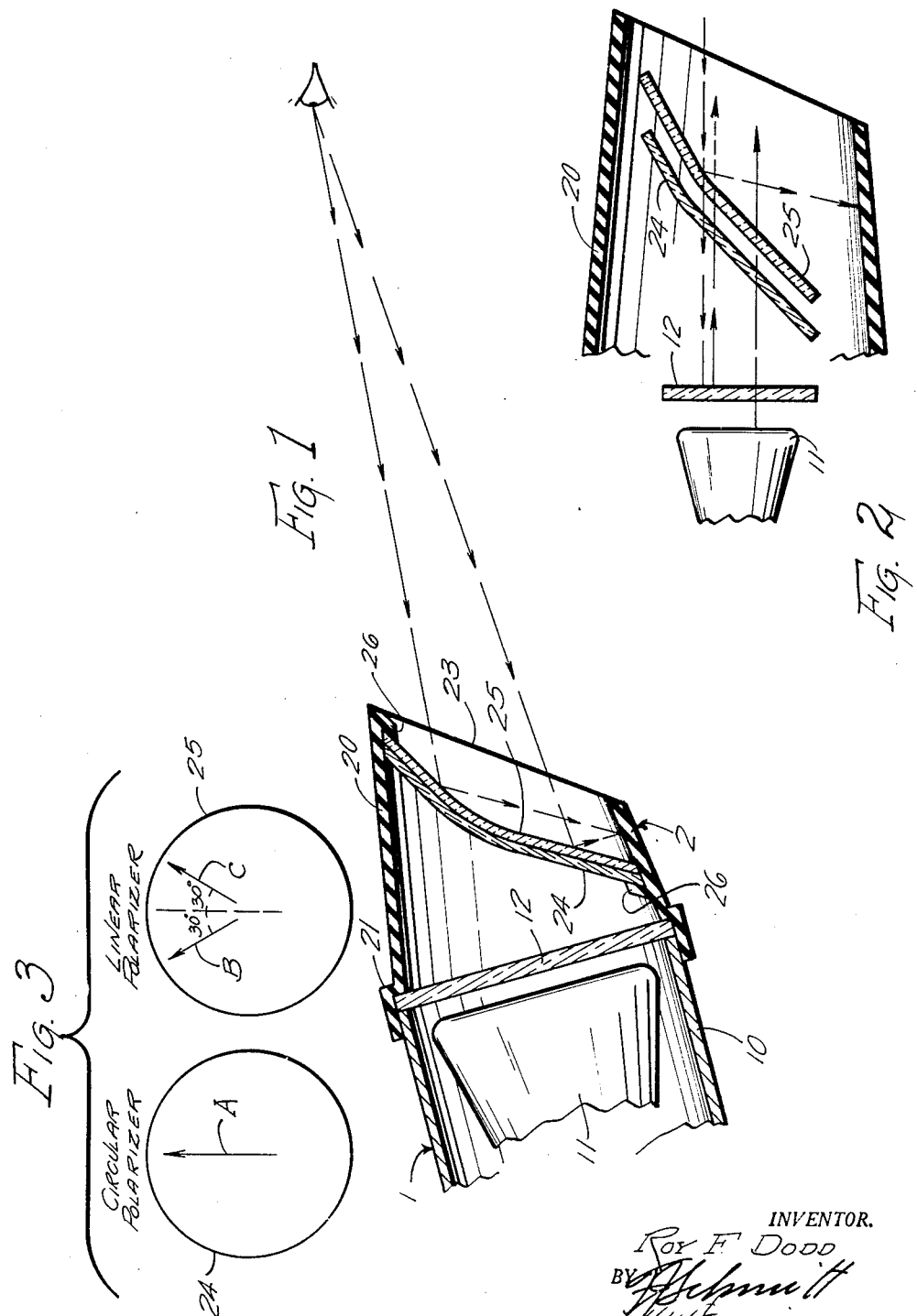
INVENTOR.
Roy F. Dodd

United States Patent Office 2,819,459
Patented Jan. 7, 1958

2,819,459

OPEN-FACE NON-GLARE TYPE VIEWING HOOD

Roy F. Dodd, Glen Burnie, Md., assignor, by mesne assignments, to the United States of America as represented by the Secretary of the Navy Application May 6, 1954, Serial No. 428,146

2 Claims. (Cl. 340—369)

This invention relates to the art of presenting instrumentation in an aircraft cockpit so that the pilot therein is confronted with devices which are easy to read regardless of exterior lighting conditions and which lessen eyestrain and physical fatigue.

More specifically, the invention is concerned with providing a viewing means for an aircraft borne radar scope which eliminates the reflected glare from sunlight and other light sources while still permitting the light emanating from the scope to be transmitted to the pilot's eye.

With the advent of radar equipment for single seat fighter aircraft the problem of providing a suitable viewing means has been particularly acute. The pilot in addition to viewing the radar scope must also follow his other instruments while performing other operations. In addition the problem is compounded by the fact that such aircraft are operated at high altitudes where extreme glare from the sun and ultraviolet conditions are encountered. Further, the scope must be mounted approximately perpendicular to the pilot's eyes so that scope parallax and aberrations are prevented. An aircraft of this type requires quite often that the scope be mounted high enough to pick up direct sunlight glare from behind the pilot's head as the pilot himself is mounted very high for maximum visibility.

Previous solutions to this problem have involved the use of closed hoods. In the modern single seat fighter aircraft, which is provided with some sort of pilot ejection means, in order to provide a closed hood high enough to reach the pilot's eyes the hood would have to extend into the pilot ejection area and present a danger to the pilot should he be jolted against it. In addition such a hood hampers the movement of the pilot. Other solutions have involved the use of simple circularly polarized filters, but this has not been satisfactory due to the extensive blue light return from the reflector behind the filter and bad reflection from the circular polarizers themselves due to the high light ambient in the cockpit.

Therefore, it is an object of this invention to provide a viewing attachment to be mounted on an aircraft borne instrument to make the instrument easier to read.

It is an object of this invention to provide a viewing attachment for a radar scope in an aircraft which filters out undesired light and causes it to be reflected to a point of focus out of the pilot's line of sight.

A further object of this invention is to provide a light filter for aircraft borne radar scopes which light filter is mounted in an open hood so that the hood does not interfere with the reading of the rest of the cockpit instruments and does not project excessively into the pilot ejection area so as to endanger the pilot.

Still another object of this invention is to provide a viewing attachment for aircraft borne instruments which can be utilized in conjunction with any equipment requiring illuminated movements behind a reflecting surface.

A still further object of this invention is to provide a light filter for an instrument viewing means that is constructed from a plurality of light polarizing means arranged to filter and reflect all undesired light away from the eyes of the viewer.

Other objects and many of the attendant advantages of this invention will be readily appreciated as the same becomes better understood by reference to the following detailed description when considered in connection with the accompanying drawing wherein:

Figure 1 is a side view of the attachment in section showing its position in relation to the eye of the viewer;

Figure 2 is a schematic side view of the attachment and shows schematically the disposition of the light; and Figure 3 is a schematic presentation of the polarizing elements showing the relative orientation of the polarizing axis of each element.

The radar scope designated by reference numeral 1 is mounted in the aircraft cockpit in a position to be almost perpendicular to the pilot's eyes. This arrangement is illustrated by the arrows coming from the eye showing the line of sight. While the viewing attachment is shown in conjunction with a radar scope it is to be understood that this is done by way of example only as the device is capable of use with any instrument requiring illumination of movements behind a reflecting surface under extensive glare conditions.

The radar scope includes the usual housing 10 which has mounted therein a scope tube 11. Fixed in the housing, in front of the tube is a glass element 12 to protect the tube surface and the other elements inside the housing. This is the conventional structure well known in the art and forms no part of the invention.

Mounted on the front of the tube housing is the viewing attachment designated generally by the reference numeral 2. The attachment includes an open hood 20. The hood is formed with an enlarged portion 21 at its base so as to fit snugly over the front of the housing. The hood is in the form of a truncated cone, the outer end of which is cut on an angle along the line 23 so as to incline toward the bottom. It may be formed of soft rubber or any other suitable material and the interior surfaces thereof at least are a dead non-reflecting black. It is relatively short so as not to unduly project into the pilot's ejection area.

Mounted in the interior of the hood 20 are a pair of polarizing elements 24 and 25 constituting a filter. These elements are formed so as to be parobolic in shape and are mounted at an angle to the longitudinal axis of the scope. The angle is such that all light reflected by the filter is focused into a narrow hood portion on the interior bottom of the hood. Thus all reflection including sunlight and cockpit glare is reflected out of the pilot's line of sight. The filter is retained in the hood by means of ridges 26 moulded integrally with the hood and placed so that one is on each side of the filter, holding the filter between the ridges and the hood.

The filter comprises a circular polarizing element 24 and a linear polarizing element 25. The polarizing axis of the linear polarizing element is oriented 30° away from the polarizing axis of the circular polarizing element. This arrangement is illustrated in Fig. 3 where the arrow A designates the polarizing axis of the element 24 while the arrows B and C indicate the two possible positions of the polarizing axis of the element 25.

The filtering and reflecting action of the viewer is illustrated diagrammatically in Fig. 2. Glare, originating either from the sun or in the cockpit itself, impinges on the surface of the linear polarizer 25 and some portion of it is reflected onto a small area in the bottom of the hood 20 as a consequence of the parabolic shape of the filter. That portion of the glare which is not reflected passes through the linear polarizer 25 and the circular polarizer 24 where it is subject to attenuation due to the polarization which takes place. This attenuated glare then impinges upon the element 12 which of course acts as a reflecting surface and the glare is now returned through the polarizing elements where its intensity is further diminished. Thus, all glare is either reflected or filtered twice through the polarizing elements. The light emanating from the face of the radar scope itself passes through the polarizers and is only slightly attenuated by the action of the filters. It is easily seen that in addition to the polarizing effect, the reflected light is filtered twice and the scope presentation only once. The reflection of the sun itself, from the indicator face, appears as dull orb, through which the scope trace can be easily distinguished.

Various modifications can be used in the construction of this to further enhance its usefulness. If the instrument on which it was desired to use this device offers a colored presentation, this could be improved by the use of tinted filters. The circular polarizer and the linear polarizer should be laminated and one easily installed filter would result.

Obviously many other modifications and variations of the present invention are possible in the light of the above teachings. It is therefore to be understood that within the scope of the appended claims the invention may be practiced otherwise than as specifically described.

What is claimed is:

1. In combination with a radar scope mounted in the cockpit of an aircraft, a viewing means comprising a hood open at both ends and mounted on the front of the scope, said hood having the shape of a truncated cone wherein the line of truncation is at an angle to the longitudinal axis of the scope, a filter located inside and spaced from each end of the cone, said filter consisting of a parabolic circular polarizer mounted at an angle to the longitudinal axis of the scope and a parabolic linear polarizer mounted adjacent the circular polarizer in the hood at an angle to the longitudinal axis of the scope, the polarizing axis of the linear polarizer being at an acute angle to the polarizing axis of the circular polarizer whereby undesired glare and reflection will be focused on the bottom of the hood and desired light emanating from the scope will be transmitted to the viewer's eyes.

2. The combination of claim 1 wherein the hood is formed of a non-reflecting black material.

References Cited in the file of this patent

UNITED STATES PATENTS

| | | |
|---|---|---|
| 2,185,705 | DuMont | Jan. 2, 1940 |
| 2,202,390 | Linsell | May 28, 1940 |
| 2,380,241 | Jellery | July 10, 1945 |

FOREIGN PATENTS

| | | |
|---|---|---|
| 708,365 | Great Britain | May 5, 1954 |